(12) United States Patent
Teratoko et al.

(10) Patent No.: US 6,223,574 B1
(45) Date of Patent: May 1, 2001

(54) THIN-WALLED RING-SHAPED MEMBER AND METHOD OF MANUFACTURING SAME

(75) Inventors: Keiichiro Teratoko; Kazuo Kataoka, both of Toyota (JP)

(73) Assignee: Suncall Corporation, Kyoto (JP)

( * ) Notice: Subject to any disclaimer, the term of this patent is extended or adjusted under 35 U.S.C. 154(b) by 0 days.

(21) Appl. No.: 09/147,470

(22) PCT Filed: May 11, 1998

(86) PCT No.: PCT/JP98/02083

§ 371 Date: Jul. 14, 1999

§ 102(e) Date: Jul. 14, 1999

(87) PCT Pub. No.: WO98/51939

PCT Pub. Date: Nov. 19, 1998

(30) Foreign Application Priority Data

May 14, 1997 (JP) ................................................ 9-124214

(51) Int. Cl.[7] .............................. B21D 19/12; B21F 3/02
(52) U.S. Cl. .................................................. 72/48; 72/135
(58) Field of Search .............................. 72/48, 135, 136, 72/129, 133, 127; 29/432.1, 432.2

(56) References Cited

U.S. PATENT DOCUMENTS

| 4,896,414 | * | 1/1990 | Hafner | 29/432.1 |
| 5,208,973 | * | 5/1993 | Sawdon | 29/243.5 |
| 5,267,383 | * | 12/1993 | Sawdon | 29/243.5 |

FOREIGN PATENT DOCUMENTS

| 52-29464 | * | 3/1977 | (JP) . |
| 61-195719 | * | 6/1986 | (JP) . |

* cited by examiner

*Primary Examiner*—Rodney C. Butler
(74) *Attorney, Agent, or Firm*—Arent Fox Kintner Plotkin & Kahn, PLLC

(57) ABSTRACT

A sheet of strip material of metal is coiled into a ring-like member, with a broader surface thereof being oriented in a radial direction. Opposite ends of the sheet of strip material are connected together by a joint. The joint includes a concave portion and a convex portion which are adapted to be engaged with each other against a repulsive force in a circumferential direction. The ring-like member is formed, on the inner periphery thereof, with teeth for engagement with a gear of a transmission, thereby producing a friction plate.

6 Claims, 8 Drawing Sheets

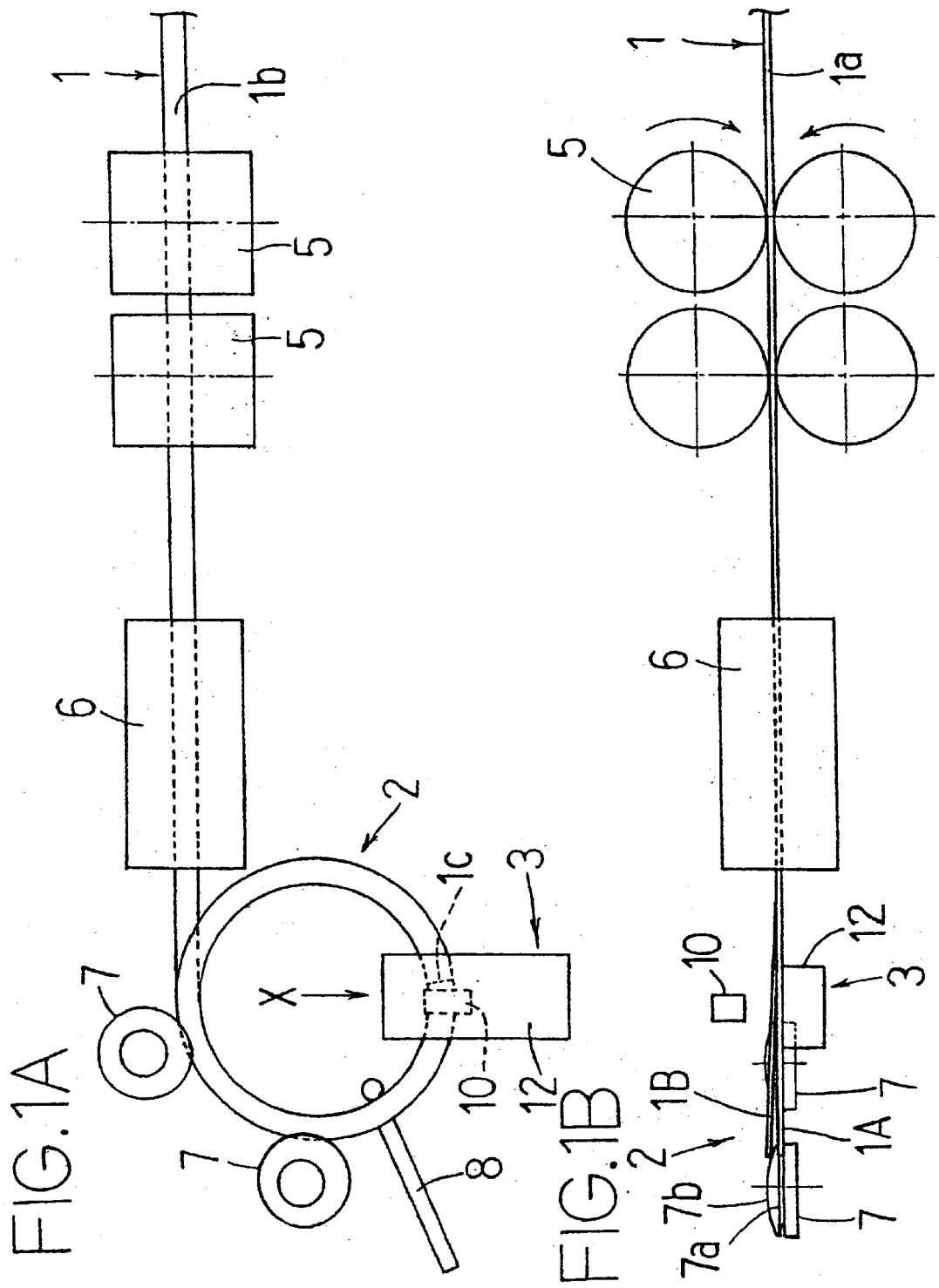

FIG.8
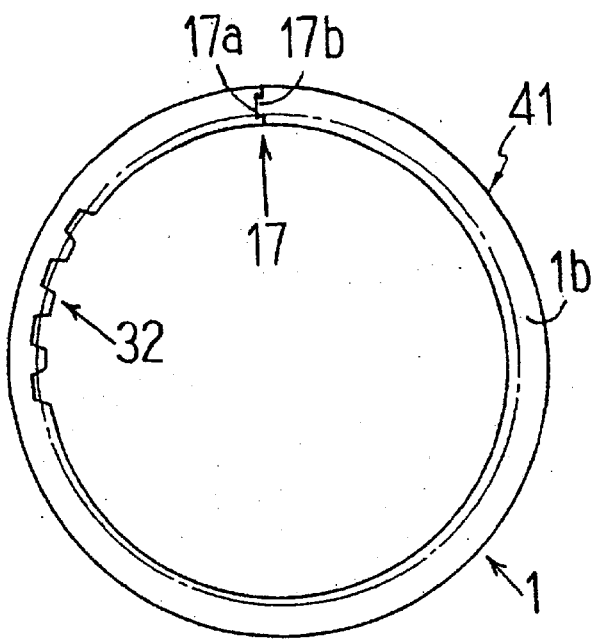
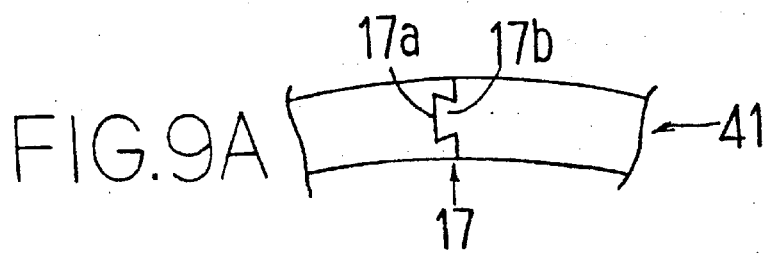
FIG.9A
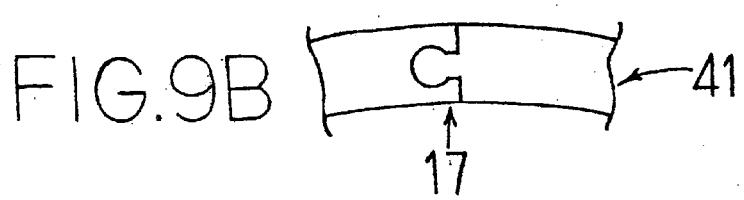
FIG.9B
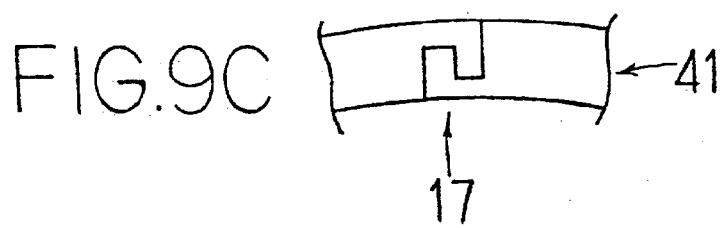
FIG.9C

X-X

THIN-WALLED RING-SHAPED MEMBER AND METHOD OF MANUFACTURING SAME

FIELD OF THE INVENTION

The present invention relates to a thin-walled ring member to be rotated at higher speeds and a method for producing the same. The thin-walled ring member may be applied, for example, to a friction plate mounted, for example, on a transmission of an automobile.

BACKGROUND OF THE INVENTION

A friction plate is used, in a transmission gear, for example, of an automobile, to allow a clutch-side and a gear-side to be rotated in a synchronous fashion, in order to prevent any shock upon gear shifting.

A conventional friction plate has been manufactured by a method comprising: punching a steel plate into an ring-like or annular body by means of a press machine, or coiling a web of steel plate so as to cause the broader surface to be extended in a common plane; cutting the superposed portions to form opposite ends; and then welding the opposite ends together.

It is noted, however, that a large amount of mills ends are produced during punching operation by means of a press machine, whereby loss of material is increased. Thus, the punching method is not advantageous in terms of manufacturing cost.

It is also noted that, according to the coiling method, it is necessary for weld overlays to be removed after welding, so as to obtain a plain surface. Thus, finishing works, such as grinding and/or buffing should be performed, whereby process step are complicated. When the opposite ends are not welded together so as to be remained "un-fixed", no finishing works are required. It is noted, however, that a friction plate is meshed with a gear incorporated in a transmission and rotated at higher speeds (at a maximum speed of about 8,000 rpm). Thus, the friction plate would be expanded in its outer diameter due to a centrifugal force, when the opposite ends of the friction plate are not connected together. This causes deficiency in that the friction plate will be in contact with a part around it.

A main object of the invention is to reduce or eliminate loss or waste of material and to reduce manufacturing cost.

SUMMARY OF THE INVENTION

A thin-walled ring member according to the invention is a thin-walled ring member having a broader surface oriented in the radial direction for use as a rotatable object, which comprises a sheet of strip material of metal coiled, with the broader surface thereof being oriented in the radial direction, so as to have opposite ends, the opposite ends being connected by means of a joint, the joint including a pair of concave and convex portions adapted to be engaged with each other against a repulsive force in the circumferential direction.

The joint is constituted by the opposite ends of the sheet of strip material which are interfit with each other, or the joint is constituted by an opening formed in the sheet of strip material so as to extend over the opposite ends of the sheet of strip material, and a joint member press-fit into the opening.

The strength of the thin-walled ring member may be further increased, when a circumferential groove is formed in the narrower surface on one or both of the inner and outer peripheries of the coiled sheet of strip material, the opposite ends of the sheet of strip material being connected by a weld located in the circumferential groove.

The thin-walled ring member may be used as a friction plate, when the ring member is formed, on one or both of the inner and outer peripheries thereof, with teeth for engagement with a gear of a transmission.

The thin-walled ring member may be produced by a method which comprises the steps of: coiling a sheet of strip material of metal, with the broader surface thereof being oriented in the radial direction, so as to cause the forward end of the broader surface to be superposed on the succeeding broader surface; cutting the superposed portions of the sheet of strip material by means of a press operation, so as to form a pair of concave and convex portions on the cut ends of the sheet of strip material, the concave and convex portions being adapted to be engaged with each other against a repulsive force in the circumferential direction; and interfitting the pair of concave and convex portions with each other by means of a pressing pressure, so as to cause the opposite cut ends to be connected together.

The thin-walled ring member may also be produced by a method which comprises the steps of: coiling a sheet of strip material of metal, with the broader surface thereof being oriented in the radial direction, so as to cause the opposite ends of the sheet of strip material to be placed in a butt relationship; forming in the sheet of strip material an opening extending over the opposite ends of the sheet of strip material, the opening having a circumferentially central portion of a reduced dimension; and press-fitting into the opening a joint member having a configuration substantially the same as that of the opening, so as to cause the opposite ends to be connected together.

A friction plate may be produced by punching one or both of the inner and outer peripheral portions of the thin-walled ring member obtained in the above, so as to form teeth for engagement with a transmission gear.

In accordance with the invention, the opposite cut ends of the ring member are connected together by means of a joint including a pair of concave and convex portions adapted to be engaged with each other against a repulsive force in the circumferential direction. Accordingly, the ring member is prevented from expanding in its outer diameter, even when it is subjected, for example, to a centrifugal force during high-speed running thereof. It is also noted that a welding operation, as well as a grinding operation and a buff operation associated therewith, may be eliminated. Thus, the process step may be simplified. The ring member is formed by means of a coiling operation, so that waste of material is eliminated, thus a significant advantage may be provided in terms of reduction in cost of material.

A friction plate having high accuracy in terms of concentricity may be produced by punching one or both of the inner and outer peripheral portions of the thin-walled ring member, so as to form teeth for engagement with a transmission gear.

BRIEF DESCRIPTION OF THE DRAWINGS

For a fuller understanding of the nature and objects of the present invention, reference should be had to the following detailed description taken in connection with the accompanying drawings wherein:

FIG. 1A is a plan view illustrating an apparatus for forming a thin-walled ring member;

FIG. 1B is a side elevational view of the apparatus shown in FIG. 1A;

FIG. 8 is a plan view of a friction plate in accordance with the invention;

FIGS. 9A to 9C are enlarged plan views respectively showing joints according to another embodiments;

BEST MODE FOR CARRYING OUT THE INVENTION

Figure 2A:
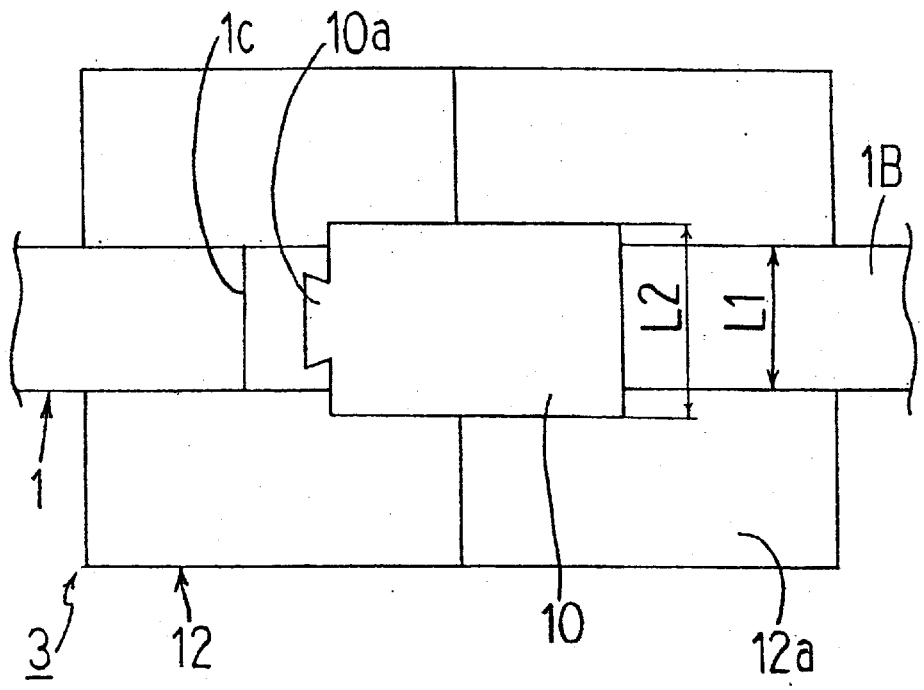
FIG. 2A is a plan view showing a punch section of the apparatus shown in FIG. 1A.

One embodiment of the invention will be explained below with reference to FIGS. 1 to 3.

FIG. 1 illustrates an apparatus for forming a thin-walled ring member, which is a preform of a friction plate, wherein FIG. 1A is a plan view and FIG. 1B is a side elevational view.

The apparatus is constituted by a coiling section 2 in which a sheet of strip material 1 of metal such as iron or steel (for example, SPCC or S15C provided in JIS) is coiled, with its broader surface being oriented in the radial direction, and a press section 3 in which the thus coiled sheet of strip material 1 is severed into an annular member having opposite ends and the opposite ends are securely inter-engaged with each other.

The coiling section 2 includes rollers 5 for transferring the sheet of strip material 1 at a predetermined speed, a guide 6 for restricting the direction in which the sheet of strip material 1 is supplied, a plurality of coiling rollers (two rollers are shown in the drawing) 7 for engaging with the thin-walled surface 1a of the sheet of strip material 1 and urging the thin-walled surface toward the inner diameter of the sheet of strip material 1, and a recoil member 8 for forming the coiled sheet of strip material 1 into a predetermined diameter.

The sheet of strip material 1 supplied from the guide 6 is restricted on its radially outer surface to be displaced toward the inner diameter of the sheet of strip material 1, upon passing through the two coiling rollers 7. By this, the sheet of strip material is coiled, with the broader surface 1b being oriented in the radial direction (one of the thin-walled surfaces 1a forms the inner diameter of the ring and the other of the thin-walled surfaces 1a forms the outer diameter of the ring). The forward end 1c of the sheet of strip material 1 having been subjected to the coiling operation is passed through the coiling section 2 and again through the coiling rollers 7 and stopped at a position adjacent to the press section 3. By this, the portion of the sheet of strip material 1 extending from the coiling rollers 7 to the press section 3 is constituted by two sheets of strip material 1, while the remaining portion of the sheet of strip material 1 is constituted by a single sheet of strip material 1. Each coiling roller 7 includes a groove 7a extending around the entire peripheral surface of the roller 7, as shown in FIG. 3. The lower sheet 1A of strip material 1 is received in the groove 7a. The upper sheet 1B of strip material 1 is lifted up onto the upper surface 7b of the coiling roller 7, so that a gap is formed between the upper and lower sheets of strip material 1A and 1B, whereby the upper and lower sheets of strip material may be coiled at the same time.

Figure 4:
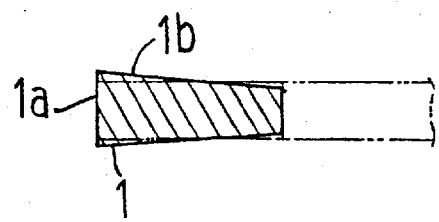
FIG. 4 is a sectional view showing a sheet of strip material.

The sheet of strip material 1 before coiling has a trapezoidal cross-section, as shown in FIG. 4, in which the portion of the sheet of strip material 1 to be formed into an inner diameter of a ring is thinner than the portion of the sheet of strip material to be formed into an outer diameter of a ring, since material flow of the sheet of strip material 1 from the outer diameter to the inner diameter of the ring is caused during coiling operation. This permits the ring after coiling to have a uniform thickness along the radial direction.

Figure 2B:
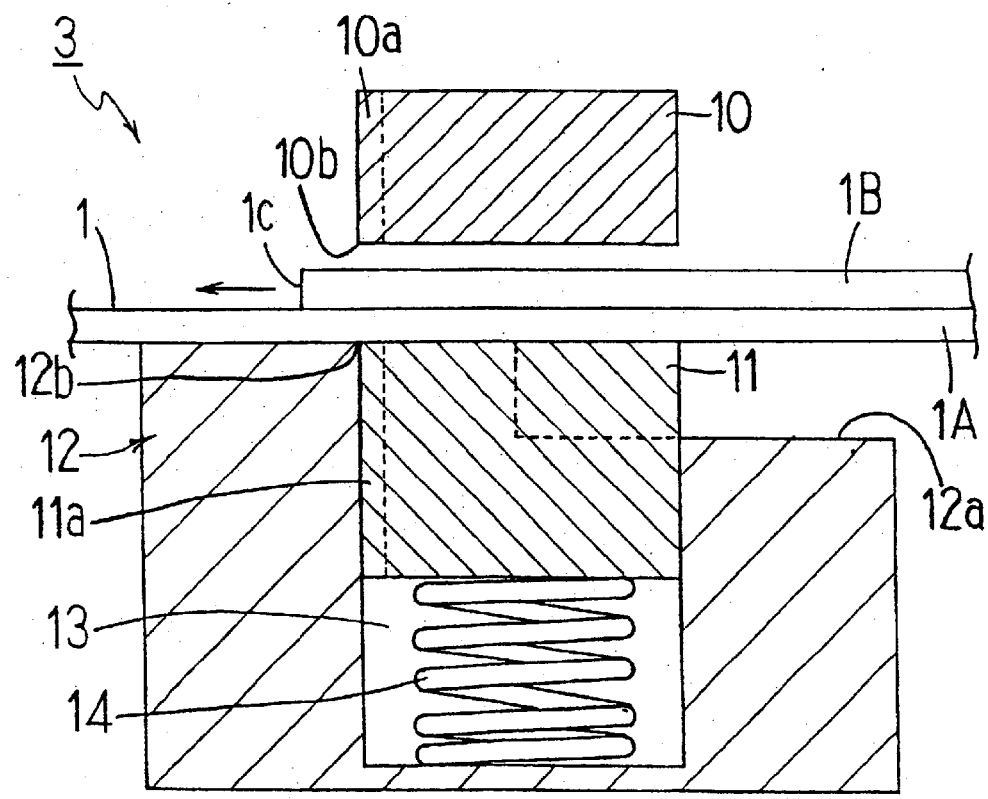
FIG. 2B is a longitudinal, sectional view of the punch section as viewed from the direction shown by an arrow mark X in FIG. 1A.
Figure 3:
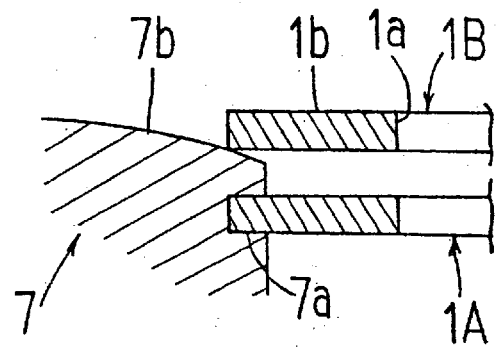
FIG. 3 is an enlarged sectional view of a coiling roller.

The press section 3 includes, as shown in FIGS. 2A and 2B, an upper punch 10 and a lower punch 11, and a die 12 (FIG. 2B is a cross-sectional view as viewed from the direction shown by an arrow mark X in FIG. 1A). The die 12 is formed with a punch hole 13 having a configuration the same as the configuration (configuration of the lower surface of the upper punch) to be formed by the upper punch 10. The lower punch 11 is accommodated for vertical movement within the punch hole 13. The lower punch 11 is resiliently supported by a spring 14. The configuration of the upper surface of the lower punch is the same as that of the lower surface of the upper punch 10.

The die 12 includes two upper surfaces 12a and 12b. The upper surface 12a, disposed opposite to the feed direction of the sheet of strip material 1 (the direction in which the sheet of strip material 1 is advanced, i.e., the direction indicated by the arrowmark in FIG. 2B), extends in a horizontal plane vertically offset from the horizontal plane in which the upper surface 12b extends. The upper and lower punches 10 and 11 are so formed to have a width L2 larger than the width L1 of the sheet of strip material 1. The upper and lower punches 10 and 11 are formed, on the end surfaces thereof facing the feed direction, with their respective protrusions 10a and 11a. Each of the protrusions 10a and 11a has a substantially trapezoidal configuration, when viewed in cross-section, with the side thereof facing the feed direction being greater than the opposite side thereof.

When punching operation is performed, one end 1c of the sheet of strip material 1 is placed at a position slightly forwardly of the protrusions 10a and 11a in the feed direction, as shown in the drawing. At this time, two sheets of strip material 1A and 1B are placed between the upper and lower punches 10 and 11. Then, the upper punch 10 is lowered. Since one upper surface 12a of the die 12, disposed opposite to the feed direction of the sheet of strip material 1, is located at a position vertically offset from the other upper surface 12b of the die 12, the upper and lower sheets of strip material 1B and 1A are cut at a position corresponding to the engagement portion between an edge portion 10b of the upper punch 10, disposed forwardly in the feed direction, and an edge portion 12b of the die 12, disposed forwardly in the feed direction, rather than being punched in a rectangular configuration. The cutting line for each sheet of strip material is of a trapezoidal configuration corresponding to those of the protrusions 10a and 11a.

Figure 5:
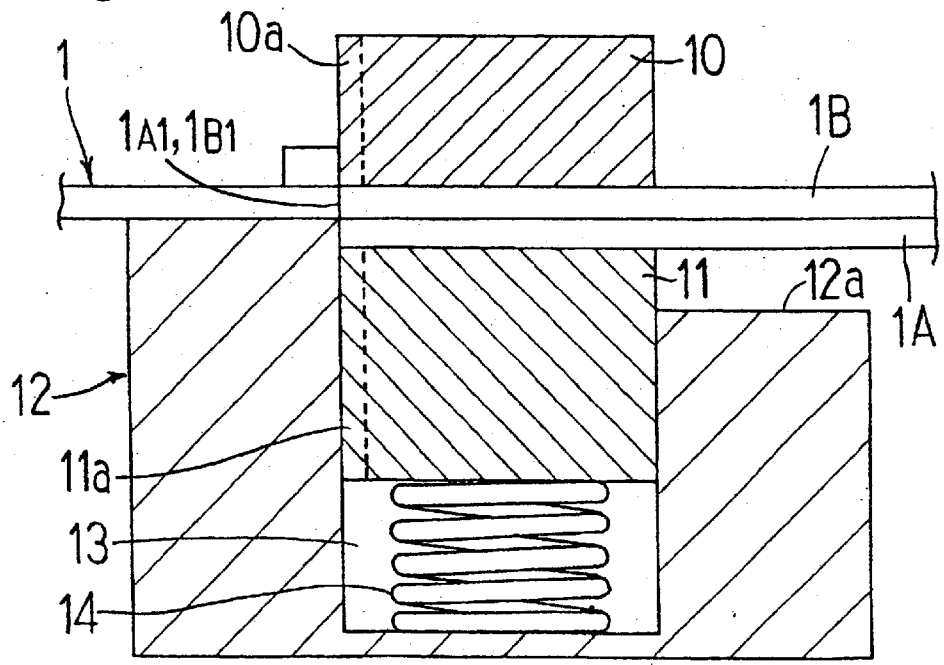
FIG. 5 is a longitudinal, sectional view of the punch section immediately after completion of its cutting operation.

When the upper punch 10 has been lowered to a position in which the cut end 1B1 of the upper sheet of strip material 1A is disposed opposite to the cut end 1A1 of the lower sheet of strip material 1A, as shown in FIG. 5, the convex portion of a trapezoidal configuration, formed on the cut end portion 1B1 of the upper sheet of strip material 1B by means of a pressing pressure, and the concave portion of a trapezoidal configuration, formed on the cut end portion 1A1 of the lower sheet of strip material 1A are interfit together. Subsequently and when the punch 10 has been raised and the resultant product has been removed, a thin-walled ring member 21 may be obtained. It is noted that the thin-walled ring member 21 includes opposite ends connected together by means of a joint 17 consisting of a concave portion 17a and a convex portion 17b which are interfit with each other, as shown in the drawing. The joint 17 is so configured that it securely retains the opposite ends of the ring in their engaged state, even when a repulsive force in the circumferential direction is applied to the opposite ends of the ring member. Thus, the ring member 21 may be maintained in its configuration even when a repulsive force, such as a centrifugal force, is exerted on the opposite ends of the ring member, so that separation of opposite ends from one another may be securely prevented.

It is advantageous to simultaneously perform forming and interfitting of a joint in a single apparatus, such as the aforementioned press section 3, since working time may be reduced and working space may be effectively used. It is noted, however, that forming and interfitting of a joint may be performed in separate apparatus, when such advantages are not specifically desired.

Figure 7:
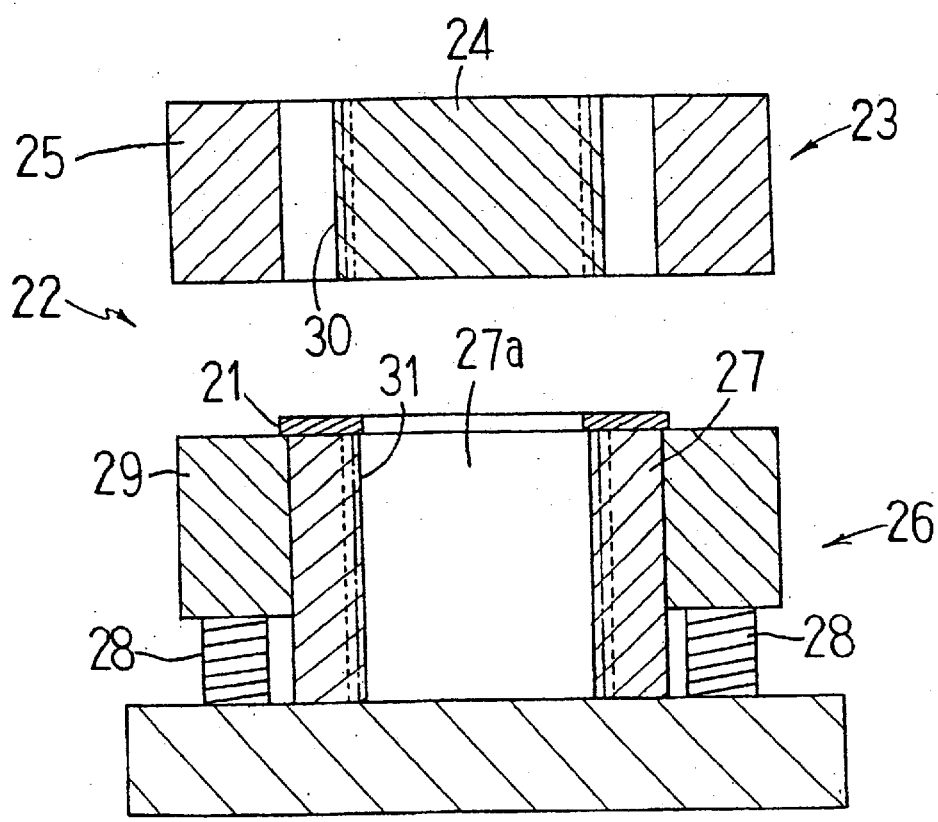
FIG. 7 is a longitudinal, sectional view showing a press machine.

The ring member 21, having been obtained in accordance with the above, is transferred to a press machine 22 shown in FIG. 7. The upper die block 23 of the press machine 22 includes an inner punch 24 and an outer punch 25. The outer punch 25 is disposed around the inner punch 24 in concentric relationship therewith, with a gap smaller than the width of the ring member 21 being formed between the outer diameter of the inner punch 24 and the inner diameter of the outer punch 25. The lower die block 26 of the press machine 23 includes a die 27 and a stripper 29. The die 27 has an inner bore 27a having a diameter larger than the inner diameter of the ring member 21. The stripper 29 is disposed around the outer periphery of the die 27 and resiliently supported by means of a plurality of springs 28. The stripper 29 has an inner diameter smaller than the outer diameter of the ring member 21. Teeth formations 30 and 31 are formed respectively on the outer periphery of the inner punch 24 and the inner periphery of the die 27. The teeth formations 30 and 31 respectively include grooves and protrusions which are inter-engaged with each other.

With the press machine 22, the ring member 21 is first placed on the die 27 in an aligned manner, and then the upper die block 23 is lowered. By this, the ring member 21 is punched along its inner diameter and outer diameter into an annular configuration. Simultaneously therewith, the teeth formations 30 and 31 of the upper die block 23 and the lower die block 26 are inter-engaged with each other, whereby a friction plate 41 is formed. The friction plate 41 includes teeth 32 extending along the inner periphery thereof for engagement with a transmission, as shown in FIG. 8. By punching the ring member 21 along its inner periphery and outer periphery by means of a press operation into an annular configuration, it is possible to accurately maintain concentricity of the inner and outer diametrical surfaces, whereby accuracy for the friction plate 41 may be increased to a substantial degree.

In the above-mentioned embodiment, the teeth 32 are formed only on the inner peripheral portion of the friction plate 41. It is noted, however, that the teeth 32 may be formed only on the outer peripheral portion of the friction plate 41, or may be formed on both of the inner and outer peripheral portions of the friction plate 41. It is also possible to eliminate the process of forming the teeth 32, when the ring member is used as a common configuration having no teeth 32.

The friction plate 41 is connected, at its cut or open ends, by means of a joint 17 consisting of a pair of concave and convex portions 17a and 17b. The concave and convex portions 17a and 17b are adapted to be engaged securely with each other against a repulsive force acting in the circumferential direction. Thus, the friction plate 41 would not be caused to be expanded in its outer diameter by means of a centrifugal force, such as when the friction plate 41 is fitted, for example, on a rotatable shaft of a transmission and rotated at higher speeds. Process steps may be also simplified, since a welding step, grinding step and a buff step, essentially included in prior art, may be eliminated. Since waste of material is significantly reduced, approximately 40% of the material is only required to form the friction plate according to the invention, when compared to a conventional friction plate which is formed in its entirety from a sheet of material by means of a press forming operation, thus providing a significant advantage in terms of reduction in cost of material.

It is sufficient for the concave portion and the convex portion the joint 17 to be designed so as to be securely engaged with each other against a repulsive force in the circumferential direction. Thus, the concave and convex portions of the joint 17 may be formed to have a circular configuration (FIG. 9B), or a hooked configuration (FIG. 9C), other than the trapezoidal configuration (FIG. 9A).

The punch section 3 may be placed at any position, provided that the coiled sheets of strip material 1 are superposed. Thus, the punch section 3 may be placed, for example, at a position in the area between the guide 6 and the upstream coiling roller 7, rather than the position shown in the drawing. In this case, it is sufficient for the sheets of strip material 1 to be superposed over a length of 10 to 15 mm.

Figure 6:
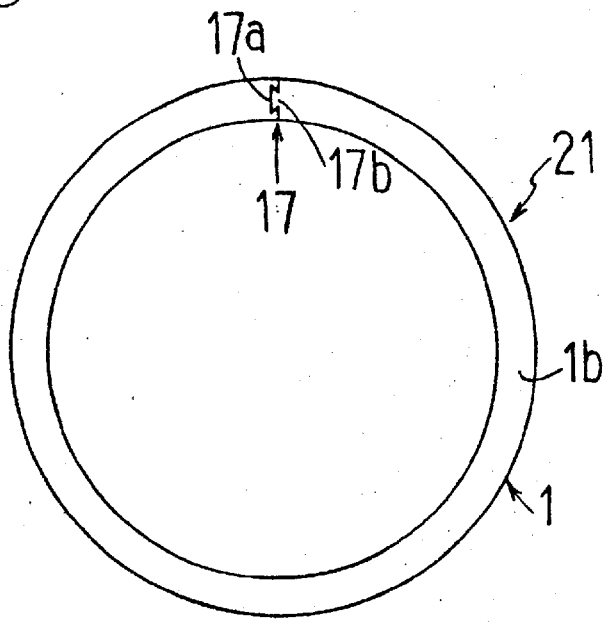
FIG. 6 is a plan view showing a thin-walled ring member in accordance with the invention.

The ring member 21 or the friction plate 41 may have a non-plate-like configuration (a configuration in which the thinner wall 1a is of a non-linear form), other than the plate-like configuration (a configuration in which the thinner wall 1a is of a linear form) mentioned above. The ring member 21 or the friction plate 41 may have, for example, a corrugated form in which the thinner wall 1a is corrugated. In this case, the operation for forming the corrugation may be performed simultaneously with the coiling operation, or may be performed in the press machine 22 shown in FIG. 7 after completion of the formation of the plate-like ring member 21 shown in FIG. 6.

Figure 10:
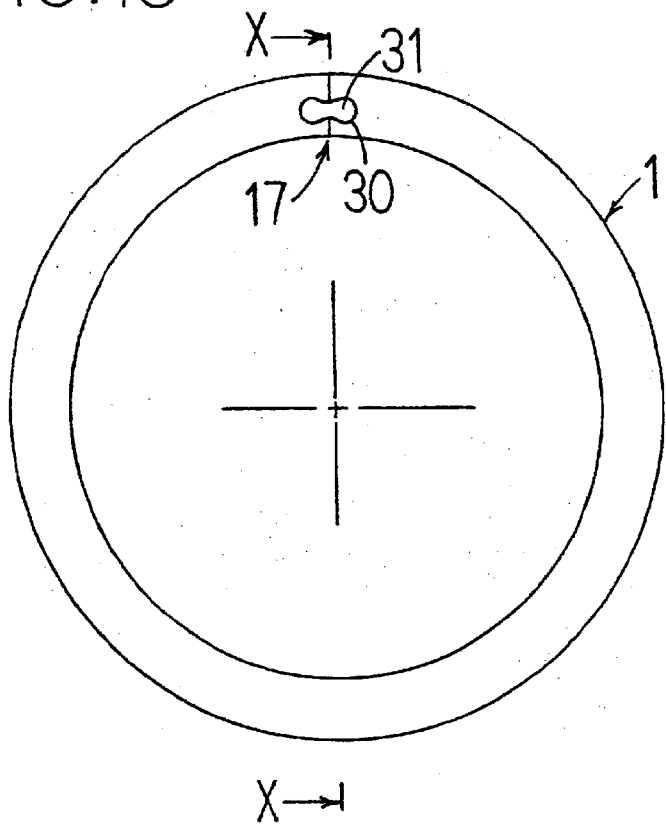
FIG. 10 is a plan view showing a thin-walled ring member according to another embodiment.
Figure 11:
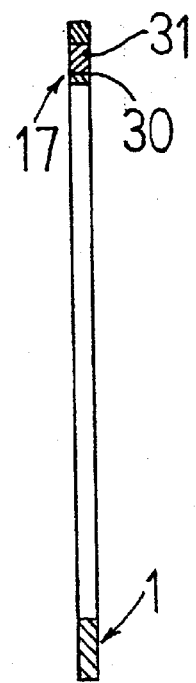
FIG. 11 is a cross-sectional view along line X—X in FIG. 10.
Figure 12:
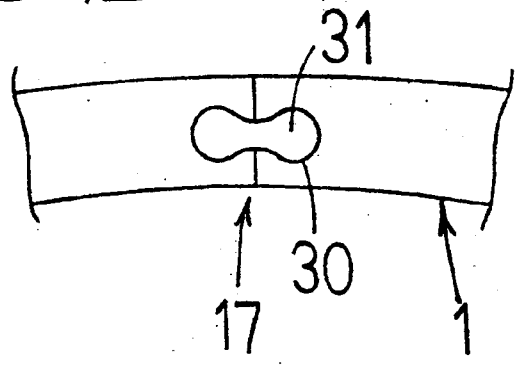
FIG. 12 is an enlarged plan view of the joint shown in FIG. 10.
Figure 13A:
FIGS. 13A and 13B are enlarged plan view respectively showing joints according to another embodiments.
Figure 13B:
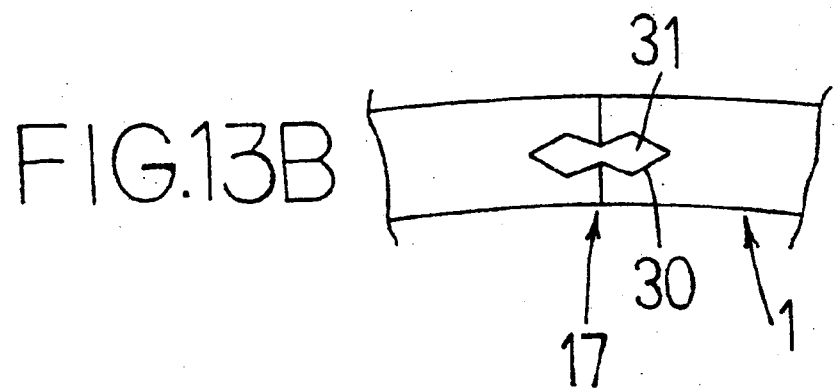

The joint 17 may be formed by placing the opposite ends of the coiled sheet of strip material 1 in abutment relationship with each other, forming, for example, an aperture 30 of a spectacle form, which extends over the opposite ends of the sheet of strip material 1, in the radially central portions of the opposite end portions by means of a press operation, and press-fitting thereinto and crimping therein a joint member 31 of a configuration the same as that of the aperture 30, as shown in FIGS. 10 to 12. The joint member 31 is preliminarily manufactured by a separate process step. The opening 30 or the joint member 31 should have a central portion narrower than the opposite end portions thereof, so that it may withstand a repulsive force exerted on the sheet of strip material 1 in the circumferential direction. The opening 30 or the joint member 31 is so formed that it is symmetrical about the narrower central portion and that the narrower portion extends through the opposite ends of the sheet of strip material 1. The joint member 31 may be configured to have a trapezoidal configuration (FIG. 13A), or a rhombic or rectangular configuration (FIG. 13B), other than the configuration having two opposite circular ends shown in FIG. 11.

Figure 14:
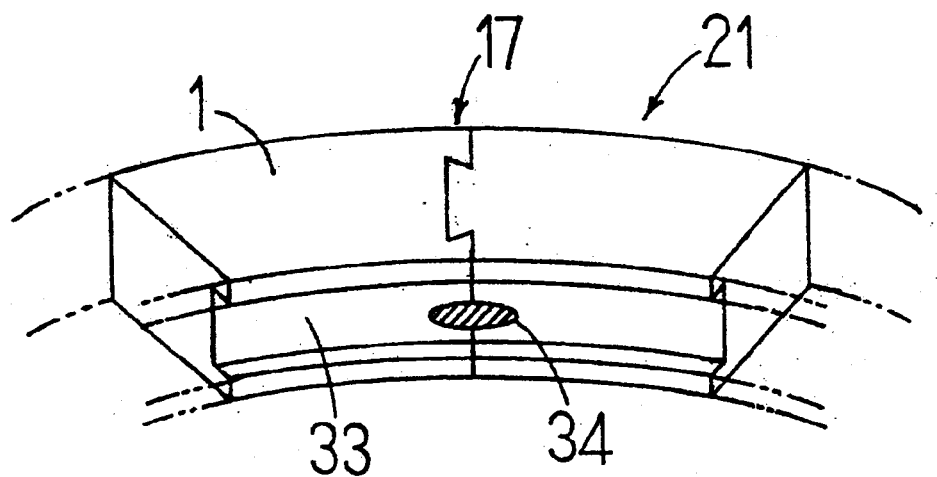
FIG. 14 is a perspective view showing a thin-walled ring member according to another embodiment.
Figure 15:
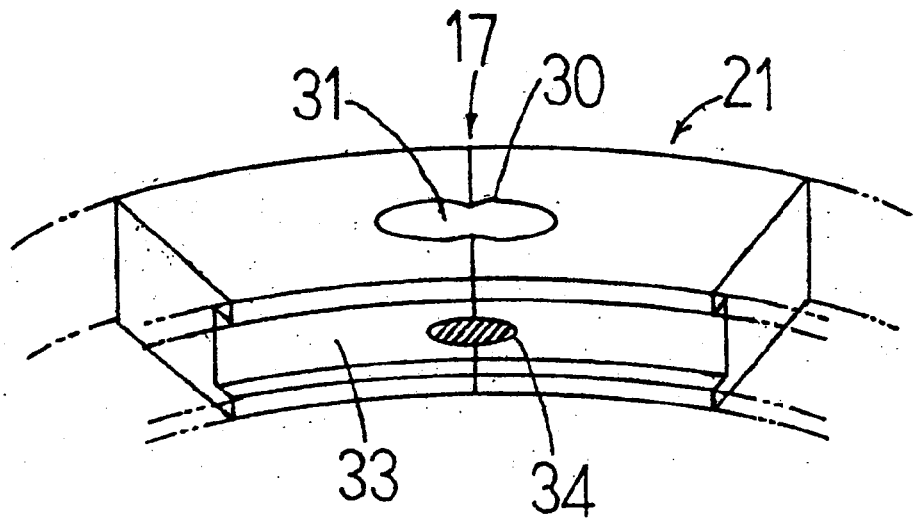
FIG. 15 is perspective view showing a thin-walled ring member according to another embodiment.

In order to further increase the strength of the ring member 21 (including the friction plate 41), a circumferential groove 33 (an annular groove is preferred) is formed in the narrower surface of the inner periphery of the ring member 21, as shown in FIGS. 14 and 15. The opposite ends of the sheet of strip material 1 in the groove 33 may be welded together by means of, for example, TIG welding, which tends to restrict occurrence of excess thickness (the welded portion is indicated by hatching in FIGS. 14 and 15). This construction provides a significant advantage in that an increased strength against a stress along the thickness of a plate is obtained. The strength may be approximately tripled, for example, when a groove having a width of 1 to 2 mm and a depth of about 0.5 mm is provided. It is noted that the welded portion 34 is positioned within the groove, in order to prevent an excess thickness after welding from protruding to the inner diameter and from contacting a cooperating member inserted within the diameter of the ring. This procedure may be applied, not only to the case in which the opposite ends of the sheet of strip material 1 are interfit and connected with each other, as shown in FIG. 14, but also to the case in which the joint member 31 is press-fit into and connected in the opening 30 extending over the opposite end portions of the strip 1. It is noted that, although not shown in the drawings, a groove 33 may be formed in the outer periphery of the ring member 21, or in the inner and outer peripheries of the ring member 21.

It will further be obvious to those skilled in the art that many variations may be made in the above embodiments, here chosen for the purpose of illustrating the present invention, and full result may be had to the doctrine of equivalents without departing from the scope of the present invention, as defined by the appended claims.

What is claimed is:

1. A thin-walled ring member having a broader surface oriented in the radial direction for use as a rotatable object, comprising a sheet of strip material of metal coiled, with the broader surface thereof being oriented in the radial direction, so as to have opposite ends, the opposite ends being connected by means of a joint, the joint including a pair of concave and convex portions that engage each other against a repulsive force in the circumferential direction, wherein a circumferential groove is formed in a narrower surface on one or both of inner and outer peripheries of the coiled sheet of strip material, the opposite ends of the sheet of strip material being connected by a weld located in the circumferential groove.

2. The thin-walled ring member according to claim 1, wherein the joint is constituted by the opposite ends of the sheet of strip material which are interfit with each other.

3. A thin-walled ring member having a broader surface oriented in the radial direction for use as a rotatable object, comprising a sheet of strip material of metal coiled, with the broader surface thereof being oriented in the radial direction, so as to have opposite ends, the opposite ends being connected by means of a joint, the joint including a pair of concave and convex portions adapted to be engaged with each other against a repulsive force in the circumferential direction, wherein the joint is constituted by an opening formed in the sheet of strip material so as to extend over the opposite ends of the sheet of strip material, and a joint member press-fit into the opening, wherein a circumferential groove is formed in a narrower surface on one or both of inner and outer peripheries of the coiled sheet of strip material, the opposite ends of the sheet of strip material being connected by a weld located in the circumferential groove.

4. A friction plate comprising the ring member according to any one of claims 1 to 3, the ring member being formed, on one or both of the inner and outer peripheries thereof, with teeth for engagement with a gear of a transmission.

5. A method for producing a thin-walled ring member having a broader surface oriented in the radial direction for use as a rotatable object, the method comprising the steps of:

coiling a sheet of strip material of metal, with the broader surface thereof being oriented in the radial direction, so as to cause a forward end of the broader surface to be superposed on a succeeding broader surface;

cutting the superposed portions of the sheet of strip material by means of a press operation, so as to form a pair of concave and convex portions on the cut ends of the sheet of strip material, the concave and convex portions engage each other against a repulsive force in the circumferential direction; and interfitting the pair of concave and convex portions with each other by means of a pressing pressure, so as to cause the opposite cut ends to be connected together, wherein a friction plate is produced by punching one or both of inner and outer peripheral portions of the thin-walled ring member to form teeth that engage a transmission gear.

6. A method for producing a thin-walled ring member having a broader surface oriented in the radial direction for use as a rotatable object, the method comprising the steps of:

coiling a sheet of strip material of metal, with the broader surface thereof being oriented in the radial direction, so as to cause opposite ends of the sheet of strip material to be placed in an abutting relationship;

forming in the sheet of strip material an opening extending over the opposite ends of the sheet of strip material, the opening having a circumferentially central portion of a reduced dimension; and press-fitting into the opening a joint member having a configuration substantially the same as that of the opening, so as to cause the opposite ends to be connected together, wherein a friction plate is produced by punching one or both of inner and outer peripheral portions of the thin-walled ring member to form teeth that engage a transmission gear.

* * * * *